United States Patent

Firkert

[15] 3,644,814
[45] Feb. 22, 1972

[54] FINE POSITIONING SYSTEM

[72] Inventor: Günter Firkert, Dresden, Germany
[73] Assignee: Veb Elektromat, Dresden, Germany
[22] Filed: Feb. 16, 1970
[21] Appl. No.: 11,571

Related U.S. Application Data

[63] Continuation-in-part of Ser. No. 811,144, Mar. 27, 1969.

[52] U.S. Cl..............................318/592, 318/640, 318/480
[51] Int. Cl. ......................................................G05b 11/18
[58] Field of Search ..........................318/592, 594, 480, 640

[56] References Cited

UNITED STATES PATENTS

| | | | |
|---|---|---|---|
| 3,096,444 | 7/1963 | Seward | 318/592 X |
| 3,349,785 | 10/1967 | Duffy | 318/480 X |
| 3,358,202 | 12/1967 | Pabst et al. | 318/594 |
| 3,372,321 | 3/1968 | Inaba et al. | 318/594 |
| 3,484,666 | 12/1969 | Easton | 318/480 X |

*Primary Examiner*—B. Dobeck
*Attorney*—Michael S. Striker

[57] ABSTRACT

The drive system positioning a drum at a selected point on a raster has a disc mounted on it. The disc has slots spaced at different radial distances from the center in different sectors. A light is placed on one side of the disc, photoelectric transducing means on the other. The photoelectric transducers are each spaced radially from the center at a distance to correspond to one of the slots. The starting position of the disc is coordinated to one point. A complete rotation of the disc corresponds to the distance between points. Light on a specific photoelectric transducer thus signifies the deviation of the drum from the selected point.

10 Claims, 6 Drawing Figures

FINE POSITIONING SYSTEM

CROSS-REFERENCE TO RELATED APPLICATION

The present application is a continuation-in-part application of U.S. application, Ser. No. 811,144, filed Mar. 27, 1969.

BACKGROUND OF THE INVENTION

This invention relates to a fine positioning system in which a machine member has been initially positioned within a predetermined tolerance of a selected point in a raster.

The invention may be used for positioning a machine member in either a single coordinate system, or in a two-coordinate system.

A system for effecting the initial positioning of a drum in a cable-forming machine in two coordinates, is described in my copending application Ser. No. 811,144, filed Mar. 27, 1969.

Here the desired coordinate is obtained from a program supplied, for example, by a punched tape. An electronic control system is disclosed in this copending application which varies the speed and the braking time for the member in relation to the path which the member must still traverse before reaching said desired location from the location at which it is actually positioned at the time. However, this positioning system is able to position the part or member within a relatively large tolerance only, due, for example, to the inertia of the moving parts, and the relatively high speed used in the positioning.

SUMMARY OF THE INVENTION

It is an object of this invention to furnish a fine positioning system and method for positioning a moving member to relatively close tolerances, after initial positioning of said member within relatively larger tolerances.

Specifically, a point is selected in the raster by means of, for example, a program. The initial rough positioning, effected by comparing the desired coordinates of the point to the actual coordinates where the member is located during the initial positioning steps, takes place to within a first predetermined tolerance, or distance of the member from the point. In order to effect a fine positioning, fine positioning signals must be generated which signify the distance between the point at which the member is located after initial positioning, and the desired point. This distance measurement may be accomplished by subdividing the system which furnish the signals for the initial coarse positioning further, so that smaller values may be measured. This requires that the initial positioning system be divided into units which are smaller than the distance between points in the raster throughout the whole system.

Alternatively, the fine positioning signals may be derived from a disc which is mounted upon the driving means for driving the member, and rotates substantially synchronously with the movement of said member. The starting position of the disc is coordinated to a point in the raster, and a 360° rotation of the disc corresponds to the distance between successive points along the path of the member. It is assumed here that the path is a single line. However, of course, a two-coordinate system can be radially accommodated by use of two such discs. The disc is divided into different sectors, selected ones of said sectors having a portion, for example in the form of an arc of a circle, spaced at a specified distance from the axis of rotation of the disc. Each sector corresponds to a specified range of distances of the member from the desired point. For example, one sector will have a size corresponding to the second predetermined tolerance, namely the distance from the selected point which is to be achieved by the fine positioning. The symmetrical sectors adjacent to this sector then define predetermined regions of distances of the member from the desired or selected point. A source of energy is positioned in operative proximity to the disc. Transducing means are positioned on the opposite side of the disc, and at such radial distances from the center or axis of rotation, that the amount of energy transmitted from the source of energy to the transducing means is at a maximum value as the slot is interposed in the path, and is at a minimum or zero when the solid portions of the sector are in the energy path. Thus the signals furnished by individual transducing means constitute fine positioning signals.

The system of this invention further comprises moving means for moving the member in response to the fine positioning signals, and braking means for braking the movement of said moving means when the member is within a second predetermined tolerance of the selected point.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
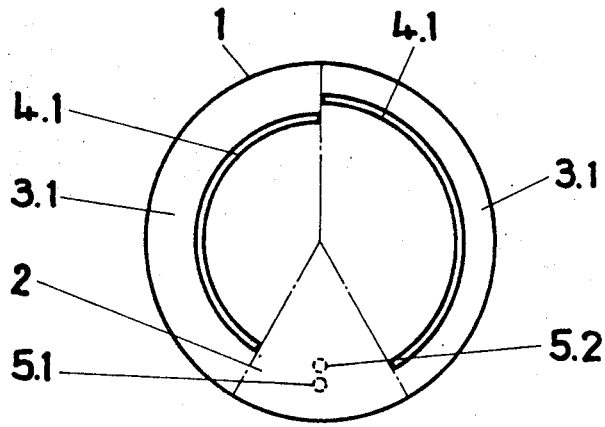
FIG. 1 is a first embodiment of fine positioning signal generating means, in accordance with the invention.

The preferred embodiments of the present invention will now be described in conjunction with the drawing.

Figure 5:
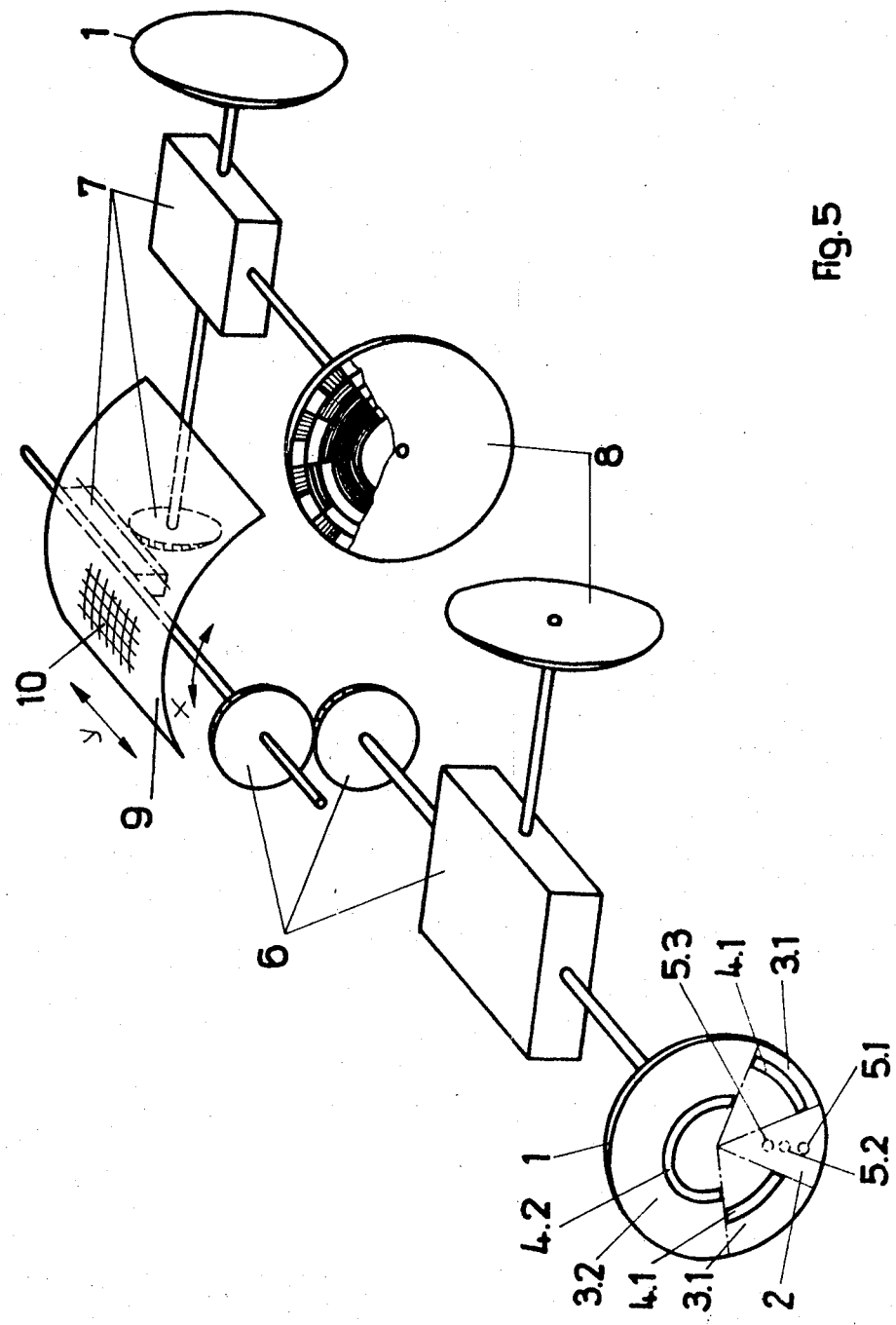
FIG. 5 is a schematic diagram of the physical arrangement of a fine positioning system, in accordance with this invention.

One physical arrangement in which the present invention may be used is illustrated in FIG. 5. Here the member to be positioned may be the drum 9 of a cable form laying machine which is to be positioned relative to a raster 10. The positioning may take place in accordance with a program derived from a tape which is not illustrated, by scanning said tape in a plurality of steps. An electronic control system receives the values of the desired coordinates and generates signals for terminating the positioning process in dependence on the length of the positioning step and the direction, as derived from a comparison between the actual position coordinate of the movable member and the desired position coordinate derived from the tape. The actual position coordinates may be derived by a photoelectric system including the binary-coded discs 8, each of which furnishes these coordinates in a predetermined direction, the two directions being at right angle to one another.

The system in accordance with the present invention is a fine positioning system to be used in conjunction with the above-described coarse positioning system, which is the subject of U.S. application Ser. No. 811,144, filed Mar. 27, 1969, of which the present application is a continuation-in-part application.

As a first embodiment of the present invention, it will be assumed that the fine positioning is carried out also by use of the discs 8. For this, it must be assumed that the lengthwise divisions on the discs 8 are smaller than the divisions on the raster 10. It is evident that for such a digital system, the binary combinations constituting the digits for the finer divisions occurring between two adjoining points in the raster will be identically repeated between each two successive points. Therefore, these signals may be used to form fine positioning signals which represent the position of the member 9 between two adjoining points along its path. This also constitutes a measure for the deviation of the actual position of the movable member from the desired coordinate value.

TABLE I.—EXAMPLE OF CODING FOR DIGITAL POSITIONING SIGNALS
BINARY CODE/SIGNALS

| Coordinates: | | $2^4$ | $2^3$ | $2^2$ | $2^1$ | $2^0$ | $2^{-1}$ | $2^{-2}$ | $2^{-3}$ | | |
|---|---|---|---|---|---|---|---|---|---|---|---|
| | 21 .. | 1 | 0 | 1 | 0 | 1 | 1 | 1 | 1 | | |
| Odd coord. | | 1 | 0 | 1 | 0 | 1 | 1 | 1 | 0 | | |
| | | 1 | 0 | 1 | 0 | 1 | 1 | 0 | 1 | | |
| | | 1 | 0 | 1 | 0 | 1 | 1 | 0 | 0 | | |
| | | 1 | 0 | 1 | 0 | 1 | 0 | 1 | 1 | | |
| | | 1 | 0 | 1 | 0 | 1 | 0 | 1 | 0 | Direction of corrective movement | Tolerance $\Delta S_1$ |
| | | 1 | 0 | 1 | 0 | 1 | 0 | 1 | 0 | | |
| | | 1 | 0 | 1 | 0 | 1 | 0 | 0 | 1 | | |
| | | 1 | 0 | 1 | 0 | 1 | 0 | 0 | 0 | Tolerance $\Delta s = 3\cdot\frac{1}{8}\cdot 5$ mm. | |
| Even coord. | 20 .. | 1 | 0 | 1 | 0 | 0 | 1 | 1 | 1 | $\Delta s = \pm\frac{3}{2}\frac{1}{8}\cdot 5 \approx 0.9$ mm. | |
| | | 1 | 0 | 1 | 0 | 0 | 1 | 1 | 0 | Finest positioning to ± 0.31 mm. | |
| | | 1 | 0 | 1 | 0 | 0 | 1 | 0 | 1 | Direction of Corrective movement | $\Delta S_2$ |
| | | 1 | 0 | 1 | 0 | 0 | 1 | 0 | 0 | | |
| | | 1 | 0 | 1 | 0 | 0 | 0 | 1 | 1 | | |
| | | 1 | 0 | 1 | 0 | 0 | 0 | 1 | 0 | | |
| | | 1 | 0 | 1 | 0 | 0 | 0 | 0 | 1 | | |
| | | 1 | 0 | 1 | 0 | 0 | 0 | 0 | 0 | | |
| | 19 .. | 1 | 0 | 1 | 1 | 1 | 1 | 1 | 1 | | |

Table 1 illustrates the signals which may be derived from a binary-coded disc 8. In this Example, a positioning process is examined in which the desired coordinate value is 20. Following the coarse positioning, the part is positioned within a first predetermined tolerance, including $\Delta S_1$ and $\Delta S_2$.

Figure 6:
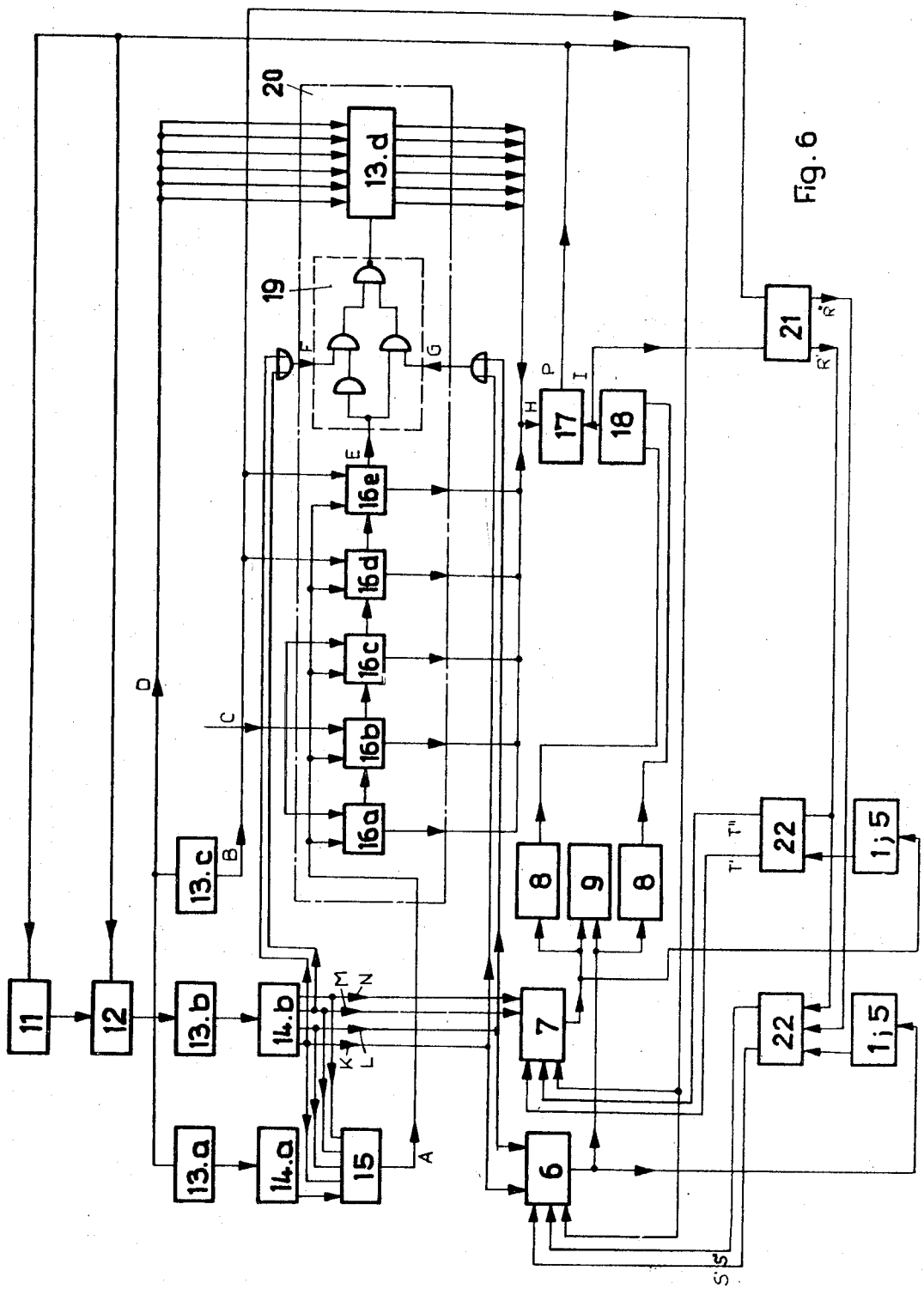
FIG. 6 is a schematic diagram of the logic circuitry of the present invention.

If after positioning, the member is in either the tolerance region $\Delta S_1$ or $\Delta S_2$, then electronic logic circuits, which are in themselves well known, and are illustrated in FIG. 6 which will be described below, cause a corrective movement towards the fine positioning tolerance, or the second predetermined tolerance region $\Delta S$ surrounding the desired coordinate which, in this case, is 20. When the fine positioning tolerance region is entered, the brakes are applied to the moving means 6, 7 which move the member 9.

In the above-described embodiment, the following conditions are obtained:

1. The raster is divided into 5 mm. divisions.
2. The smallest division of the coded disc is ⅛ of 5 mm.
3. Coarse positioning takes place to within plus or minus 2 mm.

Figure 3:
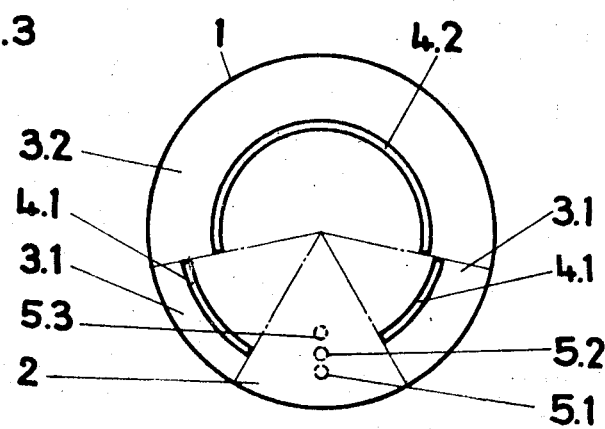
FIG. 3 is a third embodiment of fine positioning signal generating means, in accordance with this invention.
Figure 4:
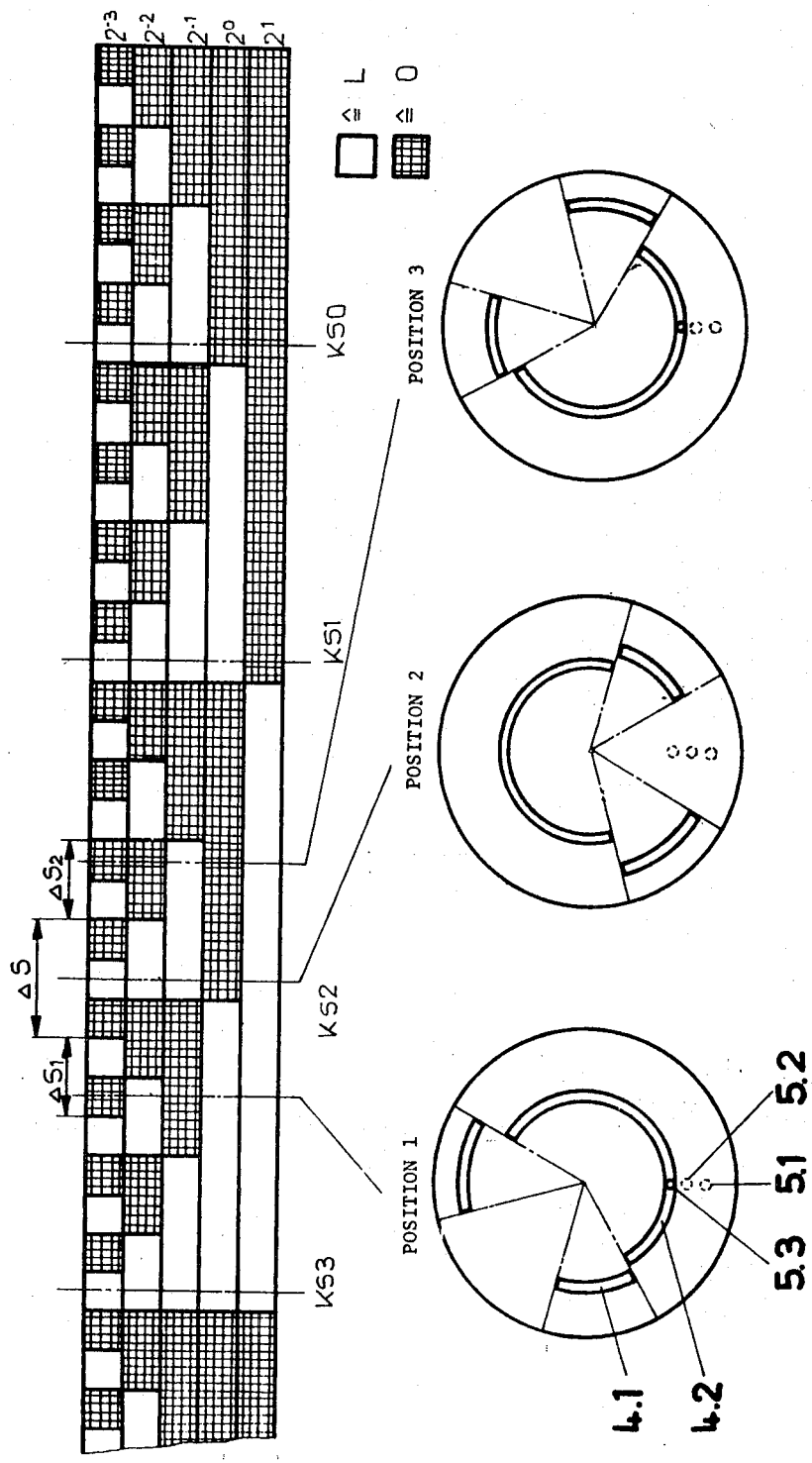
FIG. 4 illustrates the correspondence between a section of a code disc and different positions of the disc shown in FIG. 3.

In a second embodiment of the present invention, the fine positioning signals are generated by use of a disc 1 as shown in FIG. 3. The position of this disc constitutes a measure for the deviation between the desired coordinate value and the actual position of the member 9. In this embodiment, the signal I (see also FIG. 6) is derived from tack $2^0$ of the coarse positioning system, namely a positioning system using a coded disc such as disc 8 in FIG. 5. The moving means accomplishing the corrective positioning are herein controlled in the following manner:

Disc 1, as shown in FIGS. 3 and 5, has slots 4.1 and 4.2. Transducing means, here photodiodes 5.1, 5.2, and 5.3 are arranged behind the disc. As shown in FIG. 4, different positions of the disc 1 allow light to fall on a coordinated photodiode through the slot associated with the particular position. A single rotation of disc 1 of 360°, emanating from the moving means 6 and 7, corresponds to a movement of the drum 9 by 5 mm. Furthermore, a direct correspondence exists between the position of disc 8 and the position of disc 1. This is illustrated in FIG. 4, which shows a section of the code disc 8, unwound, and indicates the corresponding positions of disc 1. This is illustrated by showing three corresponding positions of disc 1 and code disc 8. If, after the coarse positioning step, disc 1 assumes a position allowing light to fall on photodiodes 5.1 or 5.2 through slots 4.1, then a corrective positioning step is initiated by logic circuit 22 (FIG. 6) towards the direction of sector 2 of disc 1, which contains no slot. When this sector is entered, the brakes are automatically applied to the moving means 6 or 7 which move the member 9.

The operation is slightly different if, after coarse positioning, the disc 1 is in such a position that light falls through slot 4.2 illuminating photodiode 5.3. In this case, the direction in which the moving means are to operate must be determined in conjunction with the signal I derived from the $2^0$ track of disc 8, which is associated with the actual position of member 9, in conjunction with the $2^0$ value of the desired position signal (signal D).

The above will be illustrated with the following Example. It is assumed that the member 9 is to be positioned to a desired coordinate $KS_2$. As illustrated in FIG. 4, the desired coordinate $KS_2$ expressed in binary form and considering the finer divisions, are as follows:

$$KS_2 = 2^1 \quad 2^0 \quad 2^{-1} \quad 2^{-2} \quad 2^{-3}$$
$$\phantom{KS_2 =} 1 \quad\; 0 \quad\; 1 \quad\;\; 1 \quad\;\; 1$$

Let it now be assumed that disc 1, as shown in FIG. 4, after coarse positioning, is in a position wherein the photodiode 5.3 receives light through slot 4.2. This allows the possibilities, namely, the disc may be between position $KS_2$ and position $KS_3$, or, alternatively, it may be between position $KS_2$ and $KS_1$.

Reference to FIG. 4 shows, that, if the position is between position $KS_2$ and $KS_3$, the signal derived from track $2^0$ will having the binary value 1. If however the position is between $KS_2$ and $KS_1$, then the signal derived from track $2^0$ will have the binary value 0. Similar considerations are obtained if it is desired to position to the coordinate $KS_1$. Here the binary place $2^0$ of the desired coordinate value $KS_1$ has the value 1, while the signal derived from track $2^0$ of disc 8 has the value 0 for positions between $KS_2$ and $KS_1$, and the value 1 for positions between $KS_1$ and $KS_2$. These conditions, which are again summarized below, allow unique determination of the direction in which the member must be moved to attain the desired position.

BINARY VALUE OF $2^0$ PLACE FOR:

| Actual, measured position | Desired coordinate value | Direction of Movement towards |
|---|---|---|
| L | O | smaller coordinate value |
| O | O | larger coordinate value |
| O | L | smaller coordinate value |
| L | L | larger coordinate value |

The logic circuitry for fulfilling the above conditions are well known. It is illustrated schematically as box 21 in FIG. 6. This circuit then generates the signal for corrective movement in the proper direction. The possible corrective region for this embodiment is $\pm(6/8) \cdot 5$ mm. O O Embodiments using discs shown in FIGS. 1 and 2 will now be described. Thus, in a third embodiment, the fine positioning signals, or the signals denoting the difference between the desired and actual positions of the member being moved are generated by use of a disc as shown in FIG. 1. The rotation of the disc is of course coordinated with the division of the coordinate field. Its drive is geared in such a manner that an angle of 360° corresponds to the smallest length of a positioning step or an integral multiple thereof. In the Example at hand, a 5 mm. raster of the coordinate field will be used and a movement of the drum, 9, by 5 mm. is made to correspond to a 360° rotation of disc 1. Two slots are furnished, both labeled 4.1, both denoting sectors symmetrical to sector 2 which corresponds to the second, or fine tolerance to which member 9 is to be positioned. It will be noted that the two slots are at different radial distances from the axis of rotation and that two photodiodes, denoted by 5.1 and 5.2, are furnished. The sector 2 which corresponds to the desired fine positioning tolerance, has no slot. The radial distance from the center of each photodiode corresponds to the radial distance of its associated slot. Disc 1 may be used under the following conditions:

1. The maximum deviation of the actual position of the member after coarse positioning is less than one-half of the smallest positioning step.

2. The speed for the moving means controlling the corrective movement is such that the braking occurs when the desired tolerance is achieved allowing the positioning to come to rest within the fine tolerance desired.

The corrective motion is achieved by the fact that one of the photodiodes 5.1 or 5.2 receives light through a slot 4.1. This causes corrective motion to be initiated in the desired direction. Upon entering the tolerance region, the drive for the moving means is disconnected and the positioning is braked.

Figure 2:
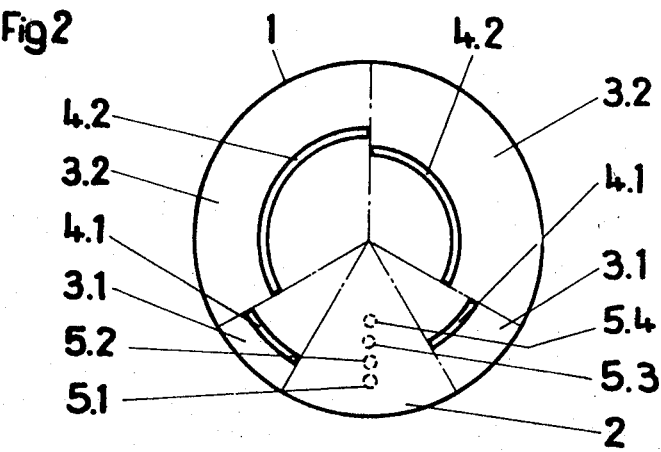
FIG. 2 is a second embodiment of fine positioning signal generating means, in accordance with this invention.

A fourth embodiment of the present invention makes use of the disc shown in FIG. 2. This disc is divided into five sectors, namely, sector 2 which has no slot and whose dimensions correspond to the desired tolerance after fine positioning, two relatively small sectors symmetrically positioned relative to sector 2 and denoted by reference numeral 3.1, and relatively larger sectors 3.2 which directed adjoin the smaller sectors 3.1. The sectors 3.2 are also symmetrical to the sector 2. The relative size of sectors 3.1 and 3.2 represent, in accordance with their dimensions, different corrective regions and contain radially spaced concentric slots 4.1, 4.2 for the illumination of four photodiodes 5.1 through 5.4. Three hundred sixty degrees of angular rotation of disc 1 again correspond to the smallest positioning step in the 5 mm. raster.

The disc, in accordance with FIG. 2, may be used under the following conditions:

1. The deviation of the desired value of the actual position after coarse positioning, is smaller than half of the smallest positioning step length.

2. The velocity of the moving means carrying out the corrective movement is such that the member does not come to rest within the desired tolerance if the drive means are disconnected and the brakes applied only when this desired tolerance region is entered. It is therefore required that the moving means 6 and 7, in particular the magnetic couplings, are activated by impulses. If for example the deviation between the desired and actual position is such that disc 1 assumes a position wherein sectors 3.1 are in the path of the light to the photodiodes 5.1 to 5.4, then the moving means 6 and 7 are driven by a shorter pulse than if the original position is one in which sectors 5.2 are in the path of the light to the photodiodes. The brakes, however, are applied as in the third embodiment, when the member is positioned to within the desired fine tolerance as represented by sector 2.

FIG. 6 shows the logic circuit for effecting the above-mentioned controls in block form. The system shown in FIG. 6 includes the coarse positioning system in the application of which this is a continuation-in-part application. The elements labeled 11, 12, 13, 14, 15, 16, 17, 19 and 20 correspond respectively to elements 1, 2, 3, 4, 5, 6, 7, 12 and 13 in the parent case and effect the coarse positioning as described in detail therein. The moving means 6 and 7 of the present application correspond to moving means 8a and 8b in the parent case. Element 9 is identical in both cases, while discs 8, in the present invention, corresponds to 10a and 10b in the parent case. Block 18 in the present invention corresponds to block 11 in the parent case. As mentioned above, the signal I, which is an output of block 18, is fed to the input of block 21, as is the signal B signifying the least significant bit of the desired position signal.

As mentioned above, the circuit furnishes an output signal, R′ or R″, indicating the direction in which the correctional movement is to take place. These signals, R′ and R″, are, respectively, applied to logic circuits 22 each of which also receives the signals from the discs represented by boxes labeled 1:5 in FIG. 6. The output of the first box 22, labeled S′ and S″, respectively, is, respectively, a signal in the direction of smaller values of the x-coordinate and a signal in the direction of larger values of the X-coordinate. The second box 22 has an output T′ and T″, respectively causing movement in the direction of smaller y for ordinate values and larger y for ordinate values. The signals S′, S″; and T′, T″ are applied to the respective moving means 6 and 7 to effect a movement of member 9 in the proper direction. Thus the fine positioning system of the present invention has been interconnected with the coarse positioning system which was disclosed in the parent application.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a system for positioning a machine member at a selected point along a predetermined path, having a plurality of points spaced at substantially equal intervals, a system for generating fine positioning signals indicating the distance of said member from said selected point after initial coarse positioning, comprising, in combination, moving means for moving said member along said predetermined path; disc means operatively connected to said moving means for rotation about an axis, in such a manner that one rotation of said disc means from a starting position has a predetermined relationship to said intervals between points, said disc means being divided into a predetermined number of sectors, at least one of said sectors having a slot spaced at a predetermined radial distance from said axis; a source of energy positioned in operative proximity to said disc means; transducing means adapted to convert into corresponding signals the energy impinging thereon, the path of energy from said source to said transducing means including said disc means, said transducing means being positioned at a radial distance from said axis corresponding to the radial distance of said slot, thereby causing the energy transmissivity to vary during rotation of said disc means in dependence upon the absence or presence of said slot, whereby the signals furnished by said transducing means constitute said fine positioning signals.

2. A fine positioning system as set forth in claim 1, wherein said source of energy is a source of illumination; and wherein said transducing means comprise photoelectric transducing means.

3. A fine positioning system as set forth in claim 1, wherein said predetermined path is a straight line; wherein the distance of said member from said selected point after initial coarse positioning is less than half of one of said substantially equal intervals; wherein one rotation of said disc means takes place during movement of said member from one point to the next sequential point along said path; wherein said disc means has a first, second and third sector, said first sector corresponding to a point and the permissible tolerances of positioning therefrom, said second sector having a slot at a first radial distance from said axis of rotation, said third sector having a slot at a second radial distance from said axis of rotation; wherein said transducing means comprise first and second transducing means, respectively placed at a radial distance from said axis as to receive energy in dependence upon said first or second slot respectively, whereby signals furnished by said first and second transducing means respectively correspond to a mispositioning of said machine member relative to said selected point in a first and second direction from said selected point along said line.

4. A fine positioning system as set forth in claim 3, also comprising control means for controlling said driving means to effect said fine positioning in response to signals from said transducing means.

5. A fine positioning system as set forth in claim 4, further comprising braking means for braking the movement of said machine member; and wherein said control means is adapted to apply said braking means to said driving means in the absence of signals from said transducing means.

6. A fine positioning system as set forth in claim 1, wherein the distance of said machine member from said point after initial coarse positioning is less than half of one of said substantially equal intervals between sequential points along said path; wherein said disc comprise a first, second, third, fourth and fifth sector, said first sector corresponding to the location of a point and the permissible tolerance therefrom, wherein said second, third, fourth, and fifth sectors have slots respectively at a first, second, third and fourth radial distance from said axis; wherein said transducing means comprise first, second, third and fourth transducing means respectively located at said first, second, third and fourth radial distance from said axis, whereby signals from a specified transducing means indicate the magnitude and direction of the actual position of said machine member relative to said selected point.

7. A fine positioning system as set forth in claim 6, wherein said moving means comprise pulse-controlled moving means; further comprising control means for furnishing pulses to said pulse controlled moving means in dependence upon signals from said transducing means.

8. A fine positioning system as set forth in claim 7, wherein said control means furnish pulses whose width depends upon the signal derived from said transducing means.

9. A fine positioning system as set forth in claim 7, wherein said control means are adapted to control the speed of said driving means in dependence upon the signals derived from said transducing means.

10. A fine positioning system as set forth in claim 3, further comprising additional photoelectric transducing means for generating signals to effect said initial coarse positioning, said additional photoelectric transducing means being adapted to generate a position signal signifying actual position of said machine member along said path, said position signal having a least significant bit, said least significant bit having a first value for odd points along said path and a second value for even-numbered points along said path; wherein said disc means comprise a first, second, third and fourth sector, said second, third and fourth sector respectively having a first, second and third slot at a first, second and third radial distance from said axis, said first sector encompassing said initial position, said second and third sectors being symmetrical to said first sector and adjacent thereto, said fourth sector encompassing a first and second section symmetrical about a line passing through said axis of rotation and said initial position of said disc means when said disc means is in said initial position; wherein said photoelectric transducing means comprise first, second and third photoelectric transducing means respectively positioned relative to said axis to receive light through said first, second and third slots; and further comprising logic network means for combining signals from said first, second and third photoelectric transducing means with said least significant bit and the least significant bit of the desired position signal to generate said fine positioning signals.

* * * * *